June 28, 1932.   J. G. DICAIRE   1,864,986
LICENSE PLATE HOLDER
Filed June 29, 1931   2 Sheets-Sheet 2
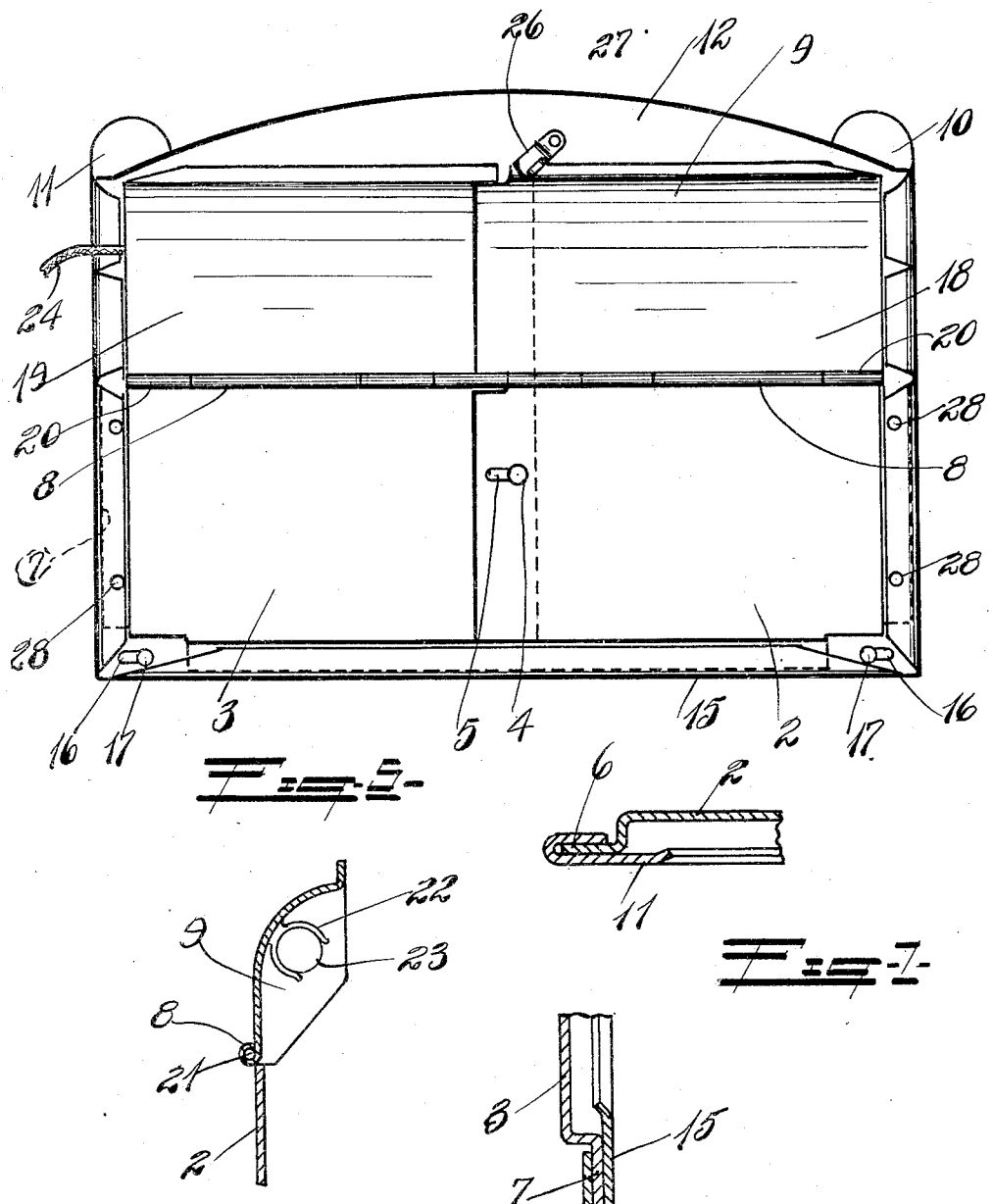
INVENTOR.
Joseph G. Dicaire
BY Frank C. Earman
ATTORNEY.

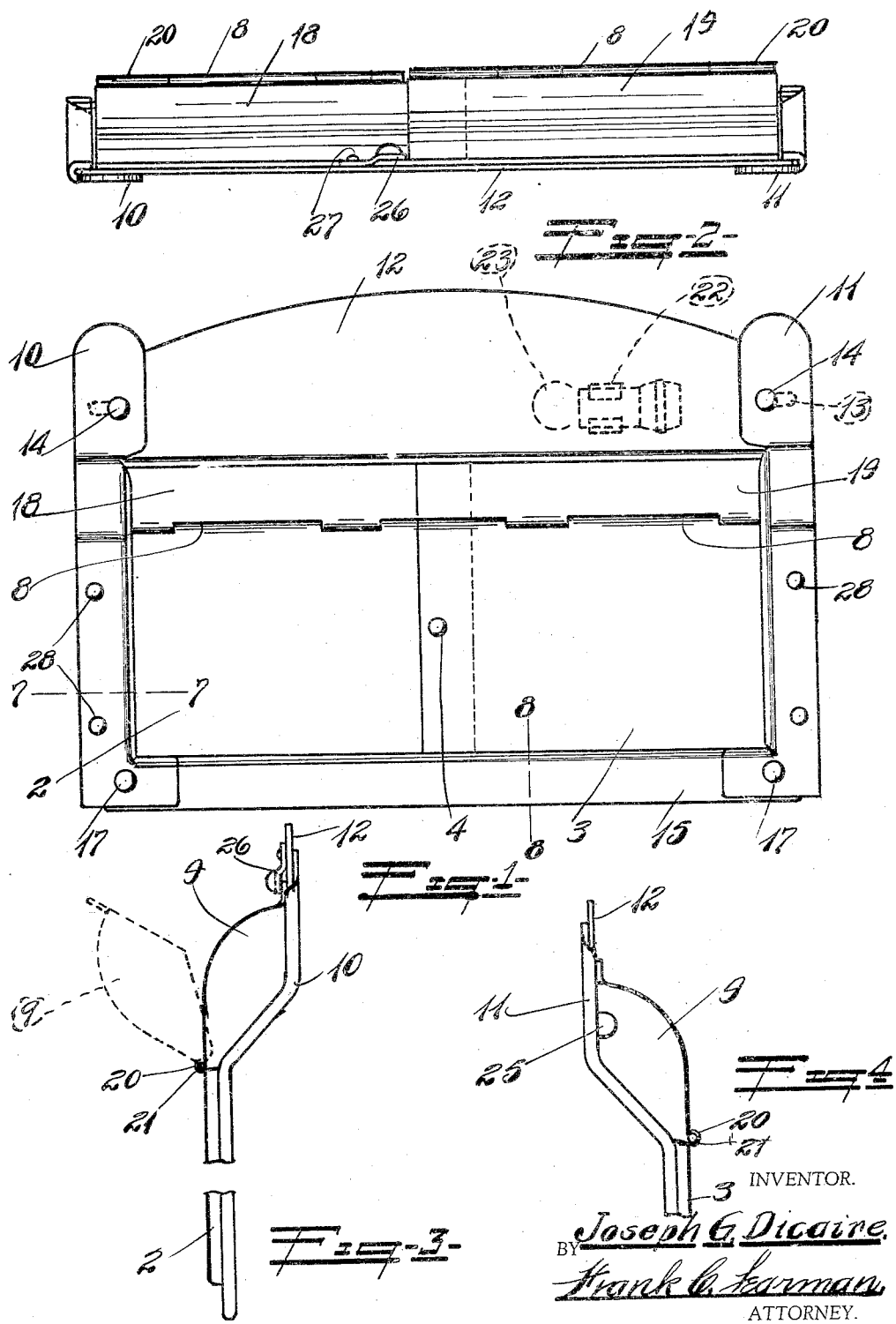

Patented June 28, 1932

1,864,986

UNITED STATES PATENT OFFICE

JOSEPH G. DICAIRE, OF FLINT, MICHIGAN

LICENSE PLATE HOLDER

Application filed June 29, 1931. Serial No. 547,593.

This invention relates to illuminated license plate holders for automotive vehicles and the like.

The prime object of the invention is to provide a license plate holder, and means for illuminating the license plate so that the license number will be clearly distinguishable.

Another object of the invention is to provide a license plate holder which can be adjusted to suit license plates of various lengths.

A further object of the invention is to provide a license plate holder made up of stampings, which can readily be secured in position, and which is simple and economical to manufacture and assemble.

The above and other objects will appear as the specification progresses, reference being had to the acompanying drawings, in which I have shown the preferred embodiment of my invention, and in which like reference numerals indicate like parts throughout the several views thereof.

In the drawings:

Fig. 1 is a front view of my improved plate holder.

Fig. 2 is a top plan view.

Fig. 3 is an end view, the dotted lines showing the hinged cover in open position.

Fig. 4 is a fragmentary view of the opposite end.

Fig. 5 is a rear view.

Fig. 6 is a sectional detail of the hinged cover illustrating the clips for holding the light.

Fig. 7 is an enlarged fragmentary sectional plan view taken on the line 7—7 of Fig. 1.

Fig. 8 is also a fragmentary sectional edge view and taken on the line 8—8 of Fig. 1.

The present method of securing a license plate to an automotive vehicle is haphazard and not entirely satisfactory, furthermore, the back plate is the only one which is at all illuminated, and this receives but a faint reflection from the tail light, and I have therefore designed an ornamental illuminated plate holder, which will be connected to the vehicle ignition system, and which will be clearly illuminated when other lights are required on the vehicle, it will have suitable design tending to promote careful driving, is adjustable to receive and properly hold plates of various lengths, and will be of neat and pleasing appearance.

Referring now specifically to the drawings, the back of the holder is made up of two individual plates or members 2 and 3 respectively, the inner edges being disposed in overlapping relation, and are held together by means of a bolt 4 in the usual manner, the plate 2 having a slotted opening 5, (see Fig. 5) to provide for adjustability as will be hereinafter described.

The outer edges of these plates are turned to provide flanges 6, and the lower edges are treated in a similar manner to provide the flanges 7, the corner sections being cut away and for a purpose to be presently described. Certain sections of the upper edges of the plate are rolled as shown at 8, and form a part of a hinge for connecting the cover section 9 thereto.

Side bars 10 and 11 form the ends of the holder and are formed as shown in Fig. 1 of the drawings, each bar being bent forwardly, so that the upper end or section is offset into a plane forward of the plate holding means; a header plate 12 connects the upper ends of these side bars and is provided with slotted openings 13 which are adapted to accommodate the bolts 14, so that the plate may be adjusted, the side bars being also turned to receive the ends of the header plate as well as the flanges 6 of the back plates.

A bottom bar 15 connects the lower ends of the side bars, and this bar is also turned to receive the bottom flanges of the back plate, the corners of the plates being cut away to accommodate the overlapping parts of the edges of the plates, slotted openings 16 being provided directly adjacent the ends of the bar, and bolts 17 serve to secure the members in assembled relation, and it will be obvious that by loosening the bolts 14 and 17, that the slotted openings 13 and 16 will permit the end members to be shifted to accommodate plates of various lengths.

The hinged cover or door 9 is connected to the upper ends of the back plates, and is also formed in two overlapping sections indicated at 18 and 19 respectively, the lower ends being rolled as shown at 20 and individual pintle pins 21 hingedly connect each door section to each back plate, the upper end of the cover being rounded as shown for obtaining better light reflection, as well as for general appearance.

A clip 22 is welded or otherwise secured to the inside of the cover, and a light bulb 23 is mounted therein, suitable connections 24 leading to the vehicle ignition system, and the end of the door is recessed as shown at 25 to accommodate said connections, the upper edge of the door sections being turned upwardly, and a clip member 26 is pivotally secured to the header plate by means of the rivet 27 so that the door can be securely locked in closed position.

Openings 28 are of course provided in the side member in spaced apart relation, so that the plate may be secured in position on the vehicle, and it will of course be understood that various other forms of connections or brackets may be used if desired.

I wish to direct particular attention to the fact that the upper section of the holder is offset into a plane forward of the plate holding means, so that the license plate 29 will be clearly illuminated, and it will also be understood that any desired transparent facing or cover can be used over the front to protect the plate from mud or weather. I also wish to direct attention to the ease and rapidity with which a plate can be removed and inserted, merely open the door, remove the plate and insert another.

Suitable felt and resilient strips (not shown), are provided on the bottom and ends to prevent rattle or shifting of the plate, and various minor modifications may be made in the construction without departing from the spirit of the invention.

From the foregoing description it will be obvious that I have perfected a very simple, practical, and neat appearing license plate holder for automotive vehicles.

What I claim is:—

1. A license plate holder and illuminator comprising a longitudinally adjustable main section adapted to receive a license plate, an upper section connected at each end of the main section and offset into a plane forward of the main section, an adjustable cover connected to the main section, a lamp mounted thereon for directing the light onto the license plate, and means for holding said cover in closed position.

2. A license plate holder and illuminator comprising an adjustable main section adjustable to suit plates of various lengths, a rounded cover hingedly connected to the main section and adjustable therewith, and adapted to swing outwardly and downwardly to permit the license plate being inserted or removed as a unit, a lamp mounted on said rounded cover above said license plate, and means for holding said cover in closed position.

3. A vertically disposed license plate holder and illuminator comprising a main section adapted to receive a license plate, an upper section connected at each end with the main section and offset into a plane forward of the main section, a cover on the upper end of the main section and adapted to be locked to said upper section, and a lamp mounted on said cover for illuminating said license plate.

4. A vertically disposed license plate holder comprising a longitudinally adjustable main section, an upper section connected at each end to the main section and adjustable therewith, said upper section being offset into a plane forward of the main section, and an adjustable cover hingedly connected to the main section, and engaging the back of the upper section so that the license plate may be removed or inserted as a unit when the cover is swung down.

In testimony whereof I hereunto affix my signature.

JOSEPH G. DICAIRE.